United States Patent
Selmer et al.

(10) Patent No.: US 11,618,486 B2
(45) Date of Patent: Apr. 4, 2023

(54) SYSTEM AND METHOD FOR EMERGENCY BRAKE CONTROL

(71) Applicant: Knorr Brake Company, LLC, Westminster, MD (US)

(72) Inventors: Jacob Selmer, Keymar, MD (US); Udo Merschbecker, Baltimore, MD (US); Reggie Wingate, Manchester, MD (US)

(73) Assignee: KNORR BRAKE COMPANY, LLC, Westminster, MD (US)

( * ) Notice: Subject to any disclaimer, the term of this patent is extended or adjusted under 35 U.S.C. 154(b) by 166 days.

(21) Appl. No.: 16/782,129

(22) Filed: Feb. 5, 2020

(65) Prior Publication Data

US 2020/0247437 A1  Aug. 6, 2020

Related U.S. Application Data

(60) Provisional application No. 62/801,360, filed on Feb. 5, 2019.

(51) Int. Cl.
*B60T 13/14* (2006.01)
*B61H 13/20* (2006.01)
(Continued)

(52) U.S. Cl.
CPC ............ *B61H 13/20* (2013.01); *B60T 13/686* (2013.01); *B60T 15/021* (2013.01); *B60T 13/14* (2013.01); *B60T 2270/402* (2013.01)

(58) Field of Classification Search
CPC ........ B60T 8/18; B60T 8/1705; B60T 8/1893; B60T 8/3235; B60T 13/14; B60T 13/141;
(Continued)

(56) References Cited

U.S. PATENT DOCUMENTS

| 4,856,622 A * | 8/1989 | Sartain | ................... B60T 13/22 303/2 |
| 5,484,194 A * | 1/1996 | Reinartz | ................ B60K 28/16 303/DIG. 11 |

(Continued)

FOREIGN PATENT DOCUMENTS

| CN | 101033733 A | * | 9/2007 | |
| CN | 105438140 A | * | 3/2016 | ................ B60T 1/10 |

(Continued)

OTHER PUBLICATIONS

Keyser, David E. British Hydromechanics Research Group. Technical Paper Series. "Full Power Hydraulic Brake Actuation, Circuit Design Considerations for Off-Highway Vehicles and Equipment." Presented at the 10th International Conference on Fluid Power the future for hydraulics Apr. 5-7, 1993.
(Continued)

*Primary Examiner* — Bradley T King
*Assistant Examiner* — Stephen M Bowes
(74) *Attorney, Agent, or Firm* — Whiteford, Taylor & Preston, LLP; Gregory M. Stone

(57) ABSTRACT

Disclosed are systems and methods for regulating application of an emergency brake configured to minimize jerk for riders' comfort while assuring safe application of the emergency brake. An emergency brake optimization module may be provided and positioned in fluid communication with a standard hydraulic brake system to regulate the application of the emergency brake through (i) providing an initial inflow of hydraulic fluid through a dead time caliper fill circuit to the brake supply line during a dead time period of fluid supply through the emergency brake valve to reduce dead time in emergency brake application, (ii) providing an oversized choke, or optionally no choke, in the emergency brake circuit with jerk being controlled through consumption of excess hydraulic fluid by a secondary volume con- (Continued)

sumption circuit, and (iii) providing both a dead time caliper fill circuit and a secondary volume consumption circuit to more precisely control reduction in dead time and minimization of jerk during application of the emergency brake.

27 Claims, 7 Drawing Sheets

(51) Int. Cl.
*B60T 13/68* (2006.01)
*B60T 15/02* (2006.01)

(58) Field of Classification Search
CPC ...... B60T 13/686; B60T 15/02; B60T 15/021; B60T 15/022; B60T 15/024; B60T 2201/12; B60T 2270/402; B61H 13/34; B61H 13/20

See application file for complete search history.

(56) References Cited

U.S. PATENT DOCUMENTS

| | | |
|---|---|---|
| 5,722,736 A | 3/1998 | Cook |
| 5,735,579 A | 4/1998 | Wood et al. |
| 2014/0345491 A1* | 11/2014 | Scharpf .................... B60L 7/26 |
| | | 303/3 |

FOREIGN PATENT DOCUMENTS

| | | | |
|---|---|---|---|
| CN | 107618491 A | * 1/2018 | |
| CN | 108437961 A | * 8/2018 | ............. B60T 13/14 |

OTHER PUBLICATIONS

International Search Report issued in co-pending application No. PCT/US20/16697 dated Aug. 31, 2020.

* cited by examiner

SYSTEM AND METHOD FOR EMERGENCY BRAKE CONTROL

CROSS REFERENCE TO RELATED APPLICATION

This application claims the benefit of U.S. Provisional Patent Application No. 62/801,360 titled "System and Method for Emergency Brake Control," filed Feb. 5, 2019 by the Applicant noted herein, which application is incorporated herein by reference in its entirety.

FIELD OF THE INVENTION

This invention relates generally to the emergency braking function of hydraulic brake systems for vehicles, such as rail vehicles, and more particularly to systems and methods for regulating application of an emergency brake on a rail vehicle in order to minimize jerk for passenger comfort while ensuring proper and safe administration of the emergency brake. For reference, the European Standard EN 13452-1:2003 calls this type of emergency brake mode "Safety Brake" which, in comparison to lower integrity (usually software-controlled) Emergency Brake modes, requires a higher integrity level (availability). According to EN 13452-1:2003, the Safety Brake mode must be available after Service Brake and software-controlled Emergency Brake modes have failed. This is usually achieved through mechanical means, thus securing brake force even after loss of software controls and electrical power supply on the train.

BACKGROUND OF THE INVENTION

Emergency brake response, including jerk rate (i.e., the forces on a rail car created by the rapid change in deceleration caused by application of the emergency brake) and response time (i.e., the time between initiation of the Emergency brake and the moment of reaching the target deceleration rate), are important factors in the proper, safe, and comfortable operation of a rail vehicle. Emergency braking with hydraulic brakes is initiated when power is cut to the emergency brake trainline. This trainline powers an emergency brake valve and therefore bypasses any software controls. A simplified example of such a hydraulic braking circuit is schematically shown in FIG. 1. The emergency brake valve is here designed as a 3/2-way magnetic valve 60 which, when energized, connects the two software-controlled valves 70 and 80 of the supply circuit with the caliper for closed-loop pressure regulation. When de-energized, emergency valve 60 cuts out control valves 70 and 80 and opens the emergency brake circuit, including choke 50 and pressure reducing valve 40, thus applying emergency brake pressure to the brake cylinder pistons. All emergency brake circuit controls described here are mechanical and suitable for use in safety systems and failure modes without software control. Jerk rate may initially be mechanically affected through a choke, such as choke 50, inside of an electro-hydraulic unit ("EHU").

When the brakes are released, the brake calipers retract the pads from the brake disc a set amount to reduce wear. The brake cylinder pistons, therefore, must extend to the brake disc. This process contributes to a delay in emergency brake response time. Once the brake cylinders contact the disc, the brake pressure increases to the emergency brake setting, causing sudden deceleration and resultant jerk of the rail car. A small choke size in the emergency brake circuit may be used to reduce such jerk during application of the emergency brake, particularly by restraining the volume flow through the choke that reaches the brake cylinders in a given time period. However, a small choke carries disadvantages and practical limits, in that it increases the dead time and thus even further increases the emergency brake response time, and can easily be fouled by, for example, debris in the fluid system, increasing maintenance efforts and expense.

Therefore, there remains a need in the art for systems and methods for minimizing jerk and response time in rail cars resulting from application of the emergency brake.

SUMMARY OF THE INVENTION

Disclosed herein are systems and methods for regulating application of an emergency brake, for example on at least one truck of a rail vehicle, which systems and methods are configured to minimize jerk for riders' comfort while assuring safe application of the emergency brake. An emergency brake optimization module may be provided and positioned in fluid communication with a standard hydraulic brake system to regulate the application of the emergency brake. In certain exemplary configurations, the emergency brake optimization module may include a dead time caliper fill circuit, which circuit may be positioned in parallel to the emergency brake circuit, and particularly in direct fluid communication with the brake supply line extending from the emergency brake valve to the calipers of the brake system. The dead time caliper fill circuit may be configured to provide an initial inflow of hydraulic fluid to the brake supply line during a dead time period of fluid supply through the emergency brake valve, thus reducing the overall dead time experienced by the brake system during operation of the Emergency Brake mode. In other exemplary configurations, the emergency brake optimization module may include a secondary volume consumption circuit, which circuit may be placed in direct fluid communication with the brake supply line. In this configuration, an oversized choke, or optionally no choke, may be provided in the emergency brake circuit to decrease or eliminate flow resistance in the emergency brake circuit, and in turn minimize dead time experienced upon activation of the emergency brake, with jerk being controlled through consumption of excess hydraulic fluid by the secondary volume consumption circuit. In still further configurations, both a dead time caliper fill circuit and a secondary volume consumption circuit may be provided as described above to more precisely control reduction in dead time and minimization of jerk during application of the emergency brake.

In accordance with certain aspects of an embodiment of the invention, a system for regulating application of an emergency brake on at least one truck of a rail vehicle is provided, comprising a hydraulic braking circuit having a supply circuit and an emergency brake valve positioned to regulate pressure supply to a brake on the at least one truck of a rail vehicle, and a brake supply line fluidly connecting the brake to the emergency brake valve; and an emergency brake optimization module in fluid communication with the brake supply line between the emergency brake valve and the brake; wherein the emergency brake optimization module comprises at least one of: (i) a dead time caliper fill circuit positioned in parallel to the emergency brake circuit; and (ii) a secondary volume consumption circuit in direct fluid communication with said brake supply line.

In accordance with further aspects of an embodiment of the invention, a system for regulating application of an emergency brake on at least one truck of a rail vehicle is provided, comprising a hydraulic braking circuit having a supply circuit and an emergency brake valve positioned to regulate pressure supply to a brake on the at least one truck of a rail vehicle, and a brake supply line fluidly connecting the brake to the emergency brake valve; and an emergency brake optimization module in fluid communication with the brake supply line between the emergency brake valve and the brake; wherein the emergency brake optimization module is configured to, in response to activation of the emergency brake valve, (i) supply hydraulic fluid to the brake until a pressure in the emergency brake bypass circuit module reaches a predesignated pressure limit, and (ii) direct a portion of hydraulic fluid in the brake supply line to an accumulator.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

Figure 1:
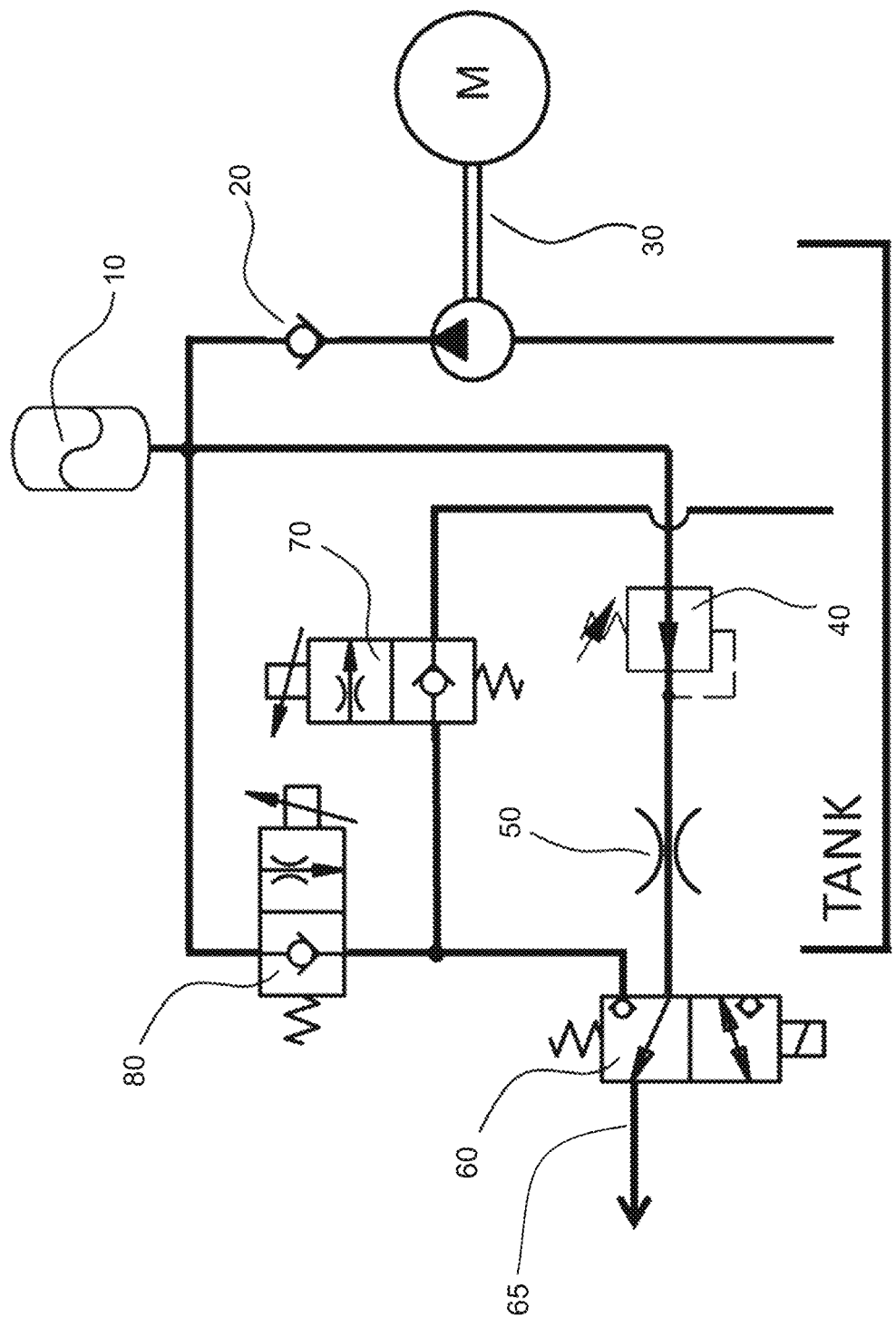
FIG. 1 is a schematic view of an exemplary prior art hydraulic braking circuit.

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form. The following descriptions detail the implementation range using active (pressure applied) calipers. Therefore, the hydraulic pressures are shown as increasing to a pressure reducing valve setting. Those skilled in the art will also recognize that passive calipers (spring applied, pressure released) can be controlled with the opposite logic of a pressure limiting valve.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

When reviewing the following discussion with reference to the enclosed Figures, the following legend of elements reflected in those Figures may be informative as a reference:
  10 Supply Accumulator
  20 Check Valve
  30 Pump-Motor Unit
  40 Pressure Reducing Valve
  50 Choke
  60 3/2-Way Magnetic Valve (Primary Emergency Valve)
  65 Brake Supply Line
  70 Tank Control Valve
  80 Supply Control Valve
  90 2/2-Way Magnetic Valve (Emergency Bypass)
  100 Pressure Reducing Valve (Emergency Bypass)
  110 Jerk-limiting Accumulator
  120 3/2-Way Magnetic Valve (Secondary Emergency Valve)

With respect to certain features of hydraulic braking systems of the kinds discussed herein, jerk may be controlled entirely with choke size, as seen in the background information discussed above (reference to choke 50 in FIG. 1) and in standard industry practice. Choke is defined as a small orifice within the hydraulic system to limit flow rate.

Figure 2:
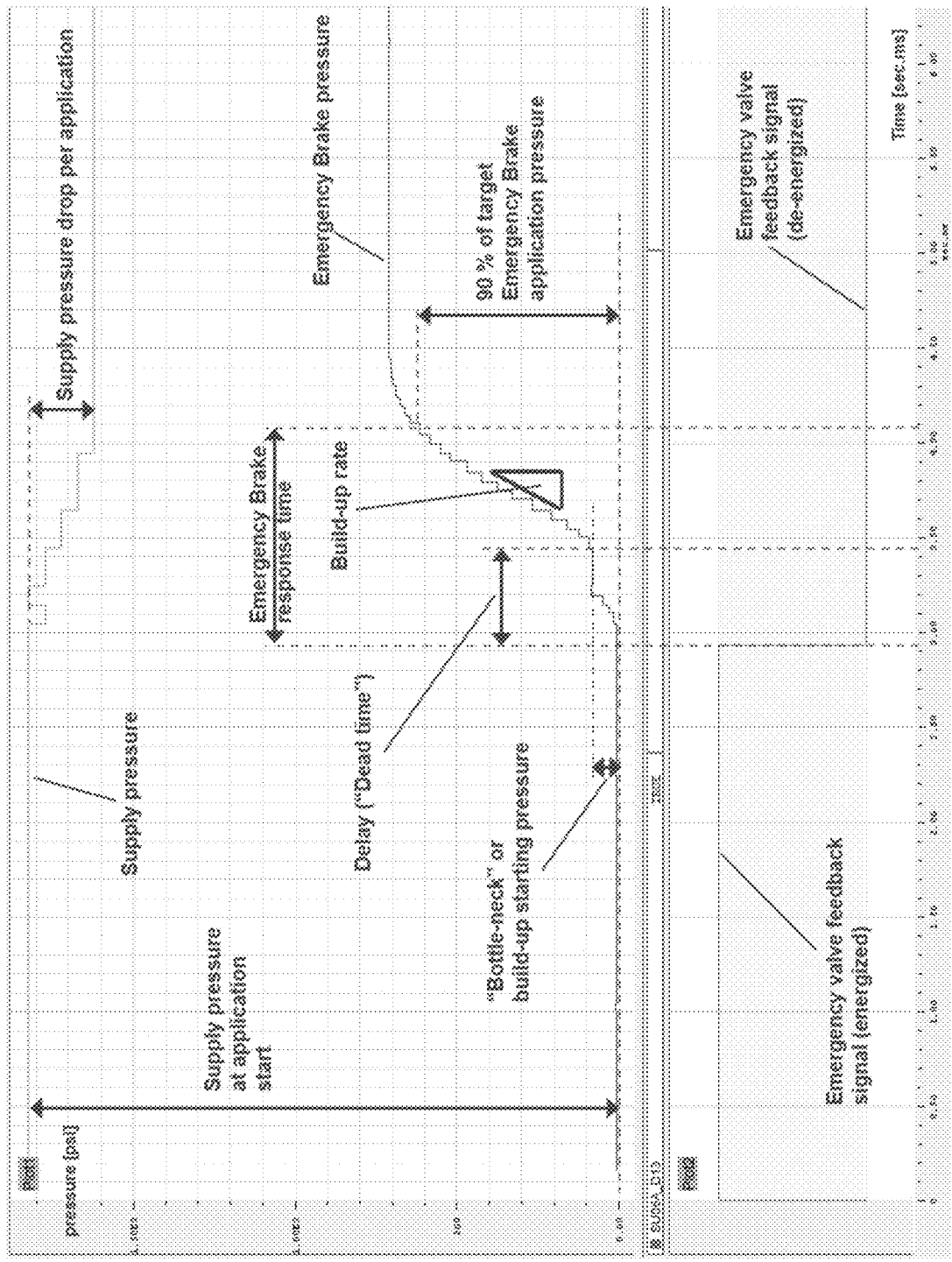
FIG. 2 is a graphical representation of the parameters characterizing a standard pressure profile of an emergency brake application.

In accordance with certain aspects of an exemplary embodiment, a system and method may be provided for reducing the dead time included in a system's emergency brake response time where the emergency brake circuit includes a standard choke 50. Dead time is that portion of the emergency brake response time from initiating the emergency brake until the brake pad contacts the disc. FIG. 2 provides an overview of the parameters characterizing a standard pressure profile of an emergency brake application. As shown in FIG. 2, total emergency brake response time comprises dead time and the build-up time. Although the dead time can technically be manipulated through the choke size, the primary function of the choke is to limit the jerk and therefore cannot be used for optimizing the dead time simultaneously.

Figure 3:
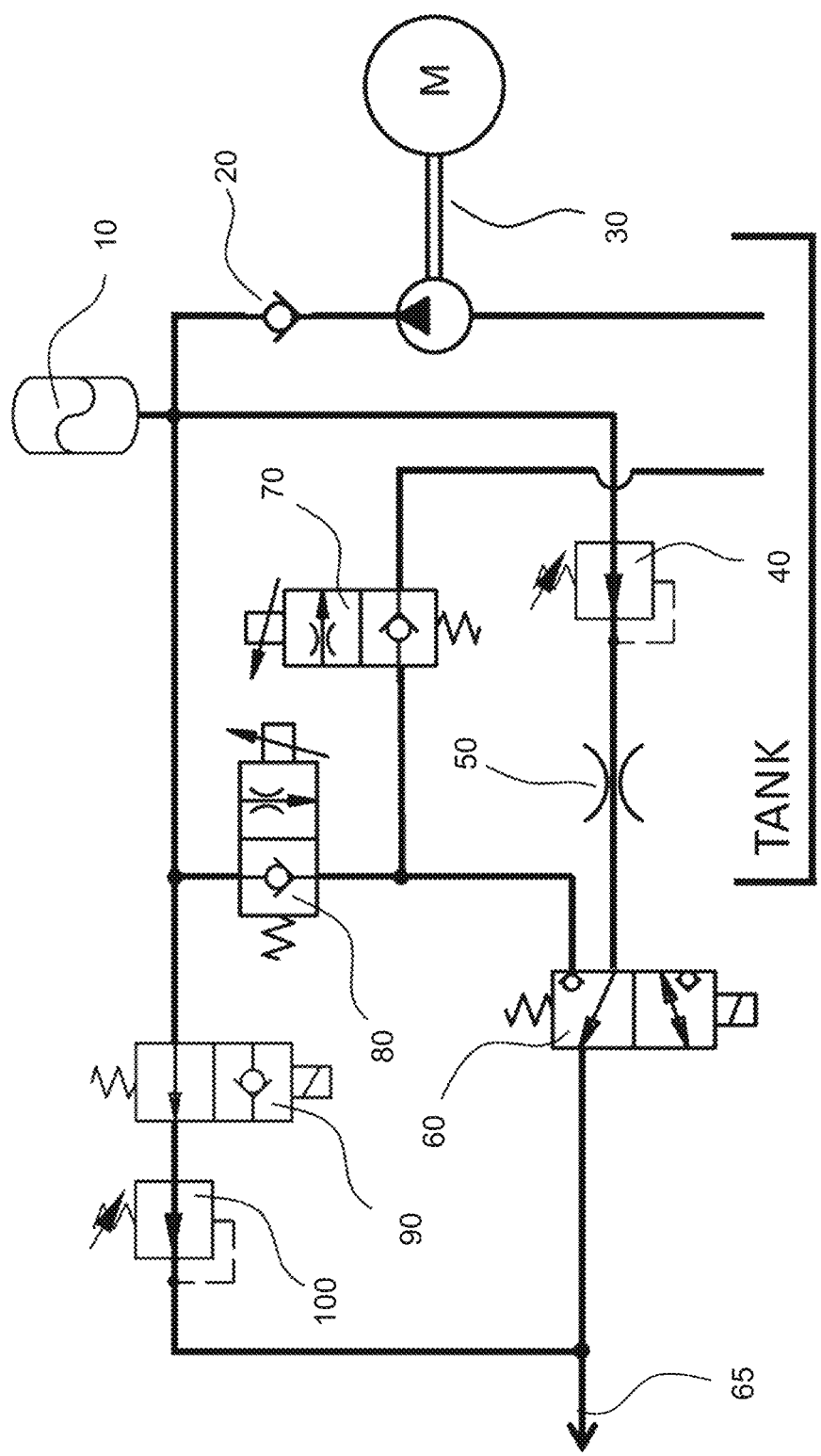
FIG. 3 is a schematic view of a system for regulating application of an emergency brake in accordance with certain aspects of an embodiment of the invention.

In order to reduce dead time, an emergency brake optimization module may be provided in fluid communication with a standard emergency brake hydraulic system. As shown in the schematic view of FIG. 3, the emergency brake optimization module may comprise a dead time caliper fill circuit including a parallel emergency brake bypass path through a 2/2-way magnetic valve 90 and a pressure reducing valve 100 positioned in parallel to the emergency brake circuit and in direct fluid communication with the brake supply line 65 to the caliper of the brake system. FIG. 3 is a schematic view of a hydraulic system including the emergency brake optimization module as part of an exemplary and simplified brake system for a rail car (the emergency brake optimization module being shown in the upper left corner of FIG. 3). The emergency brake optimization module here allows fluid to quickly fill the caliper until the pads contact the disc. The 2-2 magnet valve 90 and the emergency 3/2-way magnet valve 60 are controlled simultaneously with the emergency brake trainline. After contact the pressure increases. Once the pressure reaches the pressure setting of the pressure reducing valve 100, the emergency brake optimization module is sealed by the pressure reducing valve 100 and the original emergency brake circuit resumes exclusive control.

The pressure limit of the pressure reducing valve 100 is preferably set as low as possible to achieve quick contact with the brake disc. Then, the pressure reducing valve 100 seals the bypass circuit module and allows the original choke 50 to control the jerk. The exact setting of the pressure reducing valve 100 will depend on the individual system characteristics and requirements, which may be readily determined by those of ordinary skill in the art. Further, pressure reducing valve 100 may be formed with 2 or 3 ports, depending upon the type of pressure supply (i.e., continuous or discrete running motor-pump).

Figure 4:
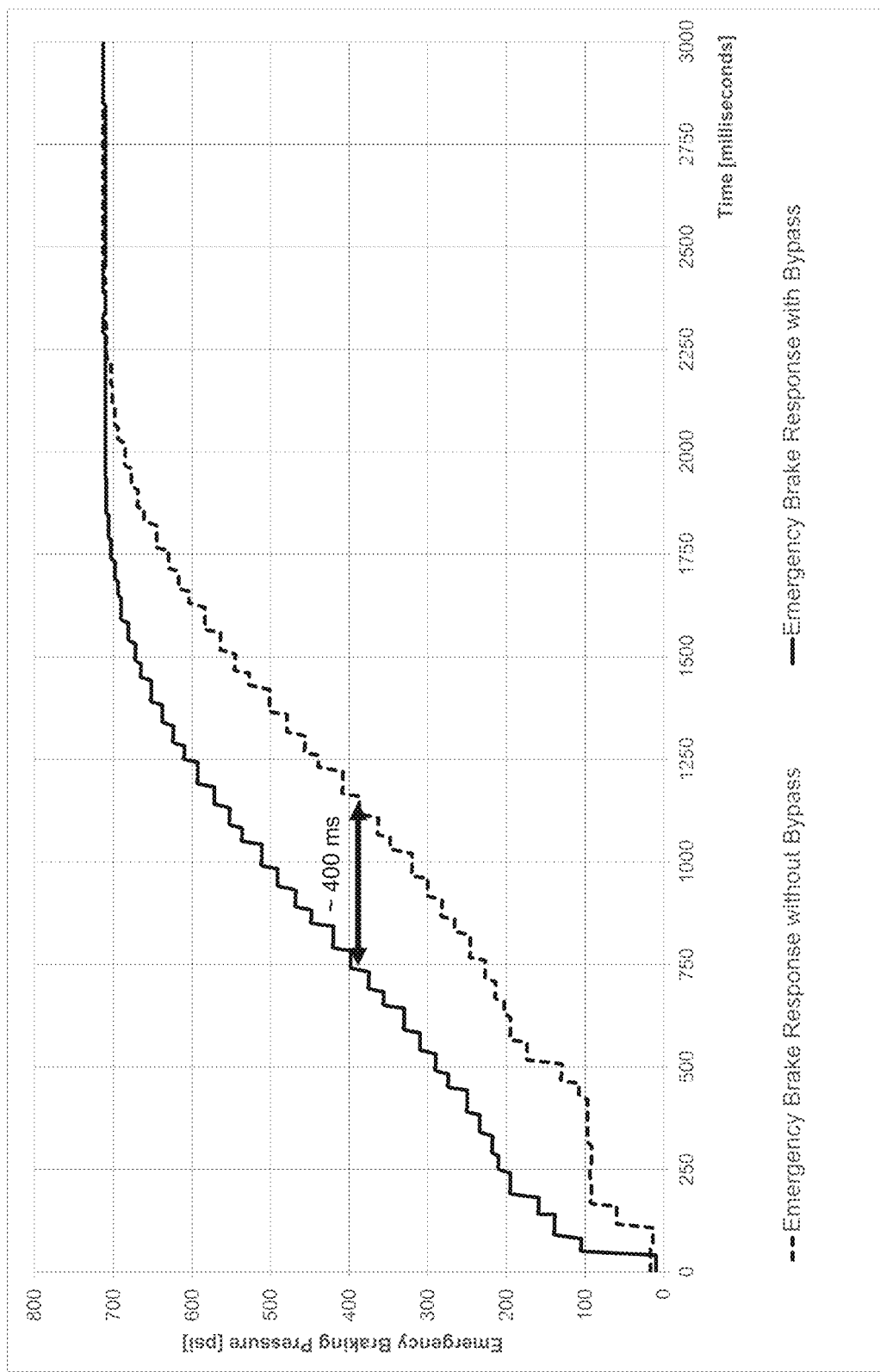
FIG. 4 is a graphical representation of dead time reduction occurring during an exemplary operation of the system of FIG. 3.

In a particularly preferred configuration, FIG. 4 shows an exemplary dead time reduction using the previously described emergency brake optimization module configured as a dead time caliper fill circuit in accordance with FIG. 3. In this particular configuration, the pressure reducing valve 100 is set such that it allows a pressure increase of initially 10 bar on the calipers when opening the dead time caliper fill circuit between the supply side and brake line. Because there are no additional flow restrictions included in the dead time caliper fill circuit, the pressure limit is reached very quickly. The introduction of the dead time caliper fill circuit in this exemplary configuration allows for the reduction of the delay before the emergency brake pressure starts to build up by approximately 400 ms. A suitable pressure reducing valve configuration is commercially available from HYDAC as their valve type DMM10121.

As explained above in the Background of the Invention, the jerk limiting capability of the choke is constrained by a minimum admissible diameter size due to the risk of contamination-induced blockage.

In accordance with further aspects of an exemplary embodiment, a system and method may be provided for reducing jerk during activation of the emergency brake where flow resistance due to the choke, and thus dead time, is significantly reduced through either elimination of the choke or use of a larger-diameter choke than in a standard hydraulic brake system. In this configuration, hydraulic fluid may now very quickly bring the brake pads into contact with the disc. In order to control jerk, additional volume is added to the caliper circuit. This volume can be provided in a variety of configurations, including by way of non-limiting example through accumulators of various types. The accumulator consumes additional hydraulic fluid during the brake pressure build-up. As the accumulator fills and builds pressure against the spring, diaphragm, or bladder, the caliper pressure also increases. To control the build-up time, and thus the vehicle jerk, larger or smaller volumes can be used, the sizes of which may readily be selected by persons of ordinary skill in the art based on particularly desired operational characteristics. The rate of increase in pressure relates directly to the rate of deceleration.

Figure 5:
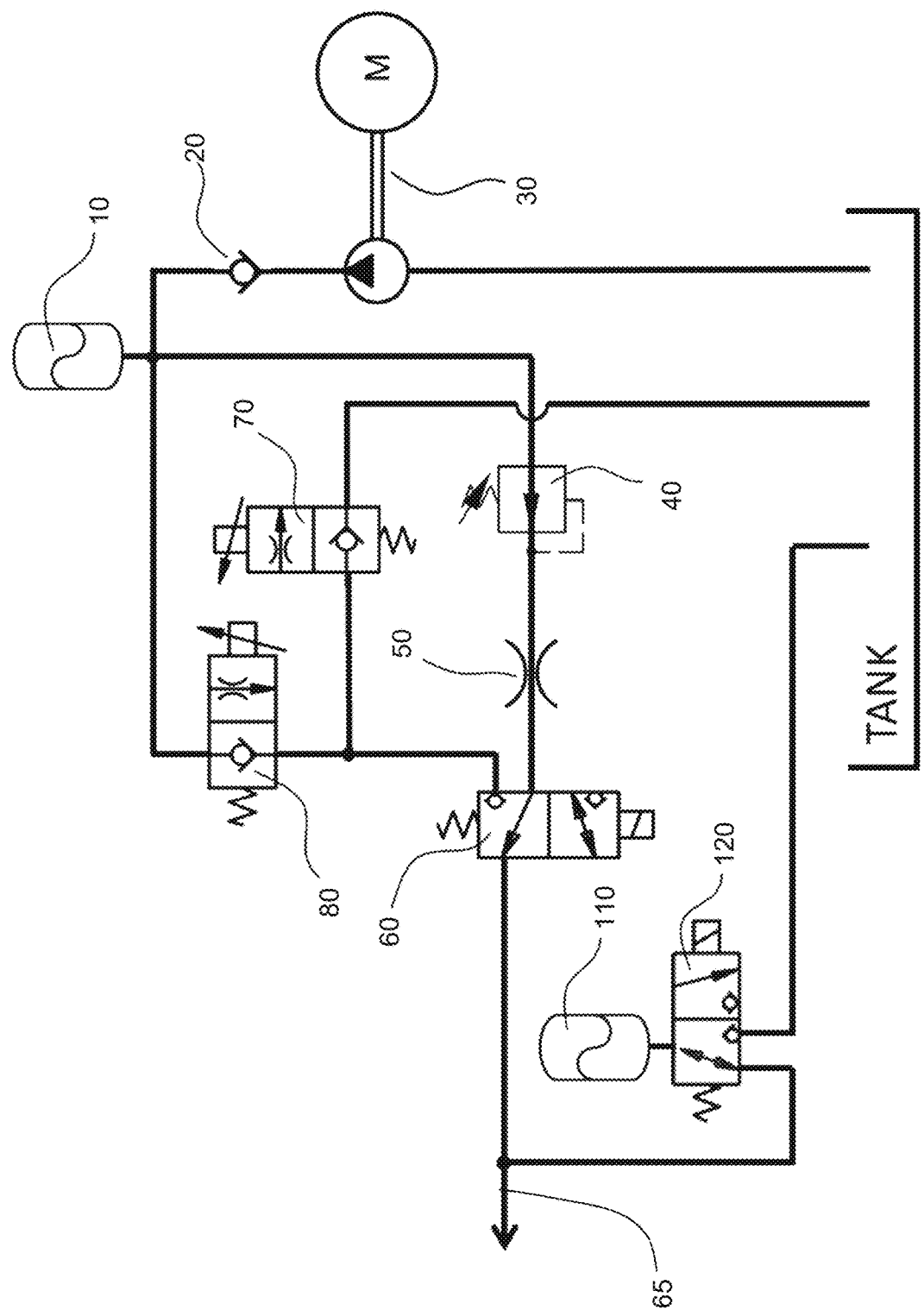
FIG. 5 is a schematic view of a system for regulating application of an emergency brake in accordance with further aspects of an embodiment of the invention.

An exemplary implementation for reducing jerk in such a configuration is shown in the lower left corner of the hydraulic schematic in FIG. 5. Here, the emergency brake optimization module comprises a secondary volume consumption circuit including a jerk-limiting accumulator 110 and a second emergency valve 120 of the same type (3/2-way magnet valve) as the primary emergency valve 60—which can be used to connect the additional volume. The secondary emergency valve 120 is controlled simultaneously with the primary emergency valve 60. The advantage of including this additional valve is to isolate the jerk-limiting accumulator 110 from the other brake modes, such as the Service Brake mode. By doing so, the oil consumption in the other brake modes is minimized.

The quick inrush function of the optimization module discussed above with respect to the system shown in FIG. 3 may be accomplished by a large choke 50 and accumulator spring or pre-charge pressure. The pre-charge pressure or spring constant may be readily selected by those of ordinary skill in the art to optimize the linear response. A minimum pre-charge pressure may be used to expedite the brake cylinder extension. If this pre-charge pressure is too high, it influences the brake pressure build-up profile. The caliper volume is quickly filled to minimize dead time, and the accumulator volume is sized to meet the required jerk. In the system configuration as reflected in FIG. 5, it is possible to achieve a lower jerk rate than with the exemplary configuration shown in FIG. 3. It does not have the contamination limitations. A system configured in accordance with FIG. 5 will require additional fluid volumes. These volumes can be significant compared to the system supply capacity, depending on the desired jerk.

Figure 6:
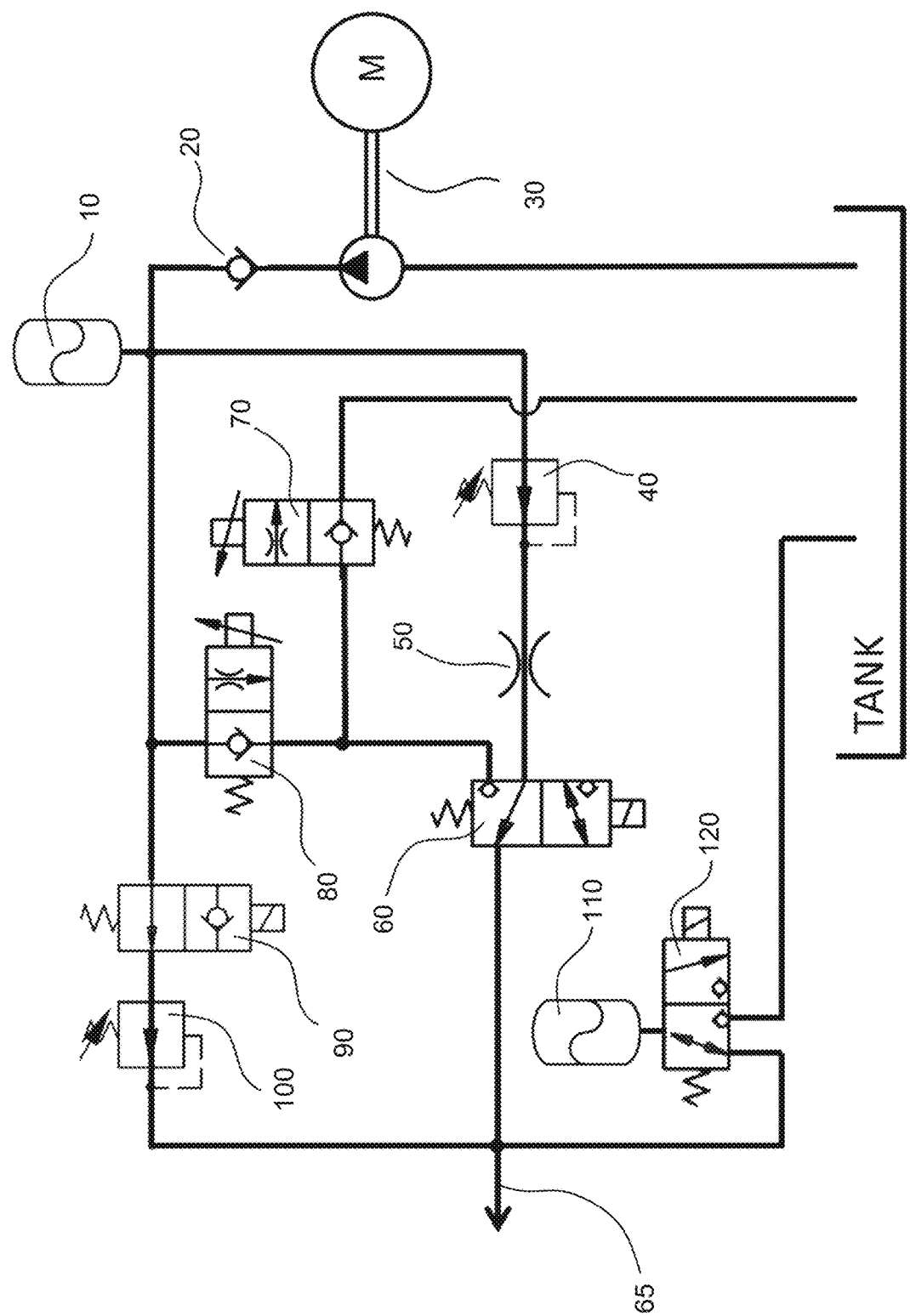
FIG. 6 is a schematic view of a system for regulating application of an emergency brake in accordance with still further aspects of an embodiment of the invention.

In accordance with still further aspects of an embodiment, and with reference to the system configuration reflected in FIG. 6, both a dead time caliper fill circuit and a secondary volume consumption circuit as discussed above may be provided to minimize the downsides and limitations that may be exhibited by the system configurations of FIG. 3 and FIG. 5. In the system configuration shown in FIG. 6, the dead time caliper fill circuit is used to quickly bring the pads into contact with the disc. Likewise, the vehicle jerk is controlled with a combination of choke size in the emergency brake circuit, and extra volume provided by the secondary brake pressure volume consumption circuit. These may be readily selected by those of ordinary skill in the art as required to minimize oil consumption and susceptibility to blocked passages.

Figure 7:
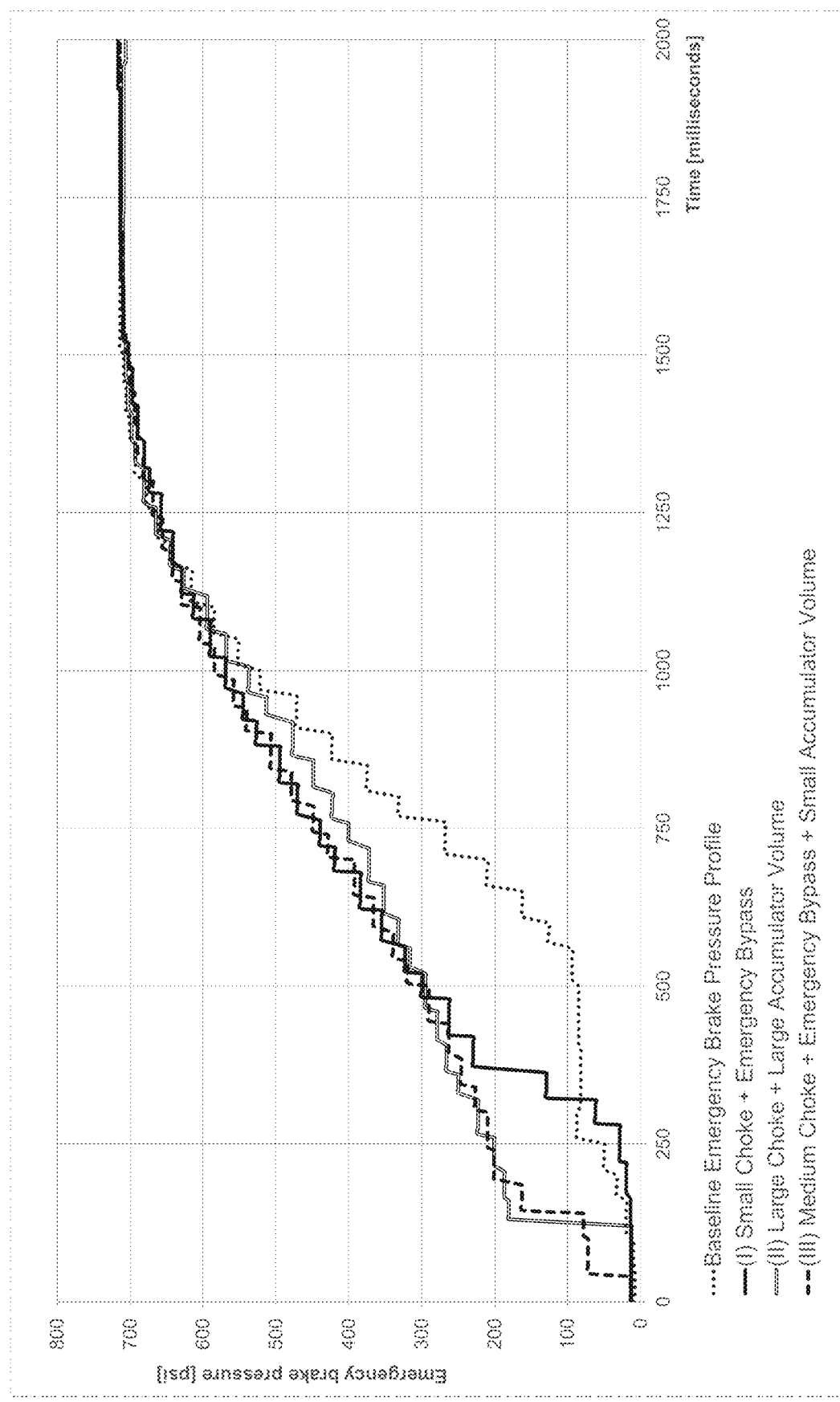
FIG. 7 is a graphical representation comparing emergency brake pressure profiles of the systems of FIG. 1, FIG. 3, FIG. 5, and FIG. 6.

FIG. 7 comparatively shows the responses for a system including a dead time caliper fill circuit (I), a secondary volume consumption circuit (II), and both a dead time caliper fill circuit and a secondary volume consumption circuit (III) as described above, wherein each is tuned to a similar build-up rate and overall response time. Traditional tuning with only a choke has a minimum practical jerk limit, due to fluid flow and increased dead times. Oil contamination risks blocking all fluid flow and would cause loss of emergency brake capability. Systems and methods implemented in accordance with at least some of the foregoing features of the instant invention allow for: (I) jerk to be minimized with only a choke, while reducing or eliminating the dead time; (II) jerk to be minimized with an additional accumulator and a large choke for dead time reduction; or (III) jerk to be controlled through a balance of choke size and accumulator size. In this way, a wider range of vehicle performances is possible using mechanical controls.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for regulating emergency brake application of a brake on at least one truck of a rail vehicle, comprising:
    a hydraulic braking circuit having a service brake circuit and an emergency brake circuit including an emergency brake valve positioned to regulate pressure supply to said brake on said at least one truck of said rail vehicle, and a brake supply line fluidly connecting said brake to said emergency brake valve; and
    an emergency brake optimization module in fluid communication with said brake supply line between said emergency brake valve and said brake;
    wherein said emergency brake optimization module comprises a dead time caliper fill circuit positioned in parallel to the emergency brake circuit, said dead time caliper fill circuit further comprising a pressure reducing valve, wherein said dead time caliper fill circuit is configured to supply pressure to said brake until a pressure in said dead time caliper fill circuit reaches a pressure limit set by said pressure reducing valve.

2. The system of claim 1, said emergency brake optimization module further comprising a secondary volume consumption circuit.

3. The system of claim 2, wherein said dead time caliper fill circuit is further configured to seal after said pressure in said emergency brake optimization module reaches said pressure limit, such that pressure is supplied to said brake through said emergency brake valve.

4. The system of claim 2, wherein said secondary volume consumption circuit further comprises an accumulator reservoir in fluid communication with a secondary emergency brake valve.

5. The system of claim 4, wherein said system is configured to simultaneously initiate both said emergency brake valve and said secondary emergency brake valve.

6. The system of claim 4, wherein said emergency brake circuit further comprises a supply accumulator and a pressure reducing valve.

7. The system of claim 6, wherein said emergency brake circuit excludes a choke.

8. The system of claim 1, wherein said dead time caliper fill circuit further comprises a 2/2-way magnet valve.

9. The system of claim 1, wherein said dead time caliper fill circuit further comprises a 2/2-way magnet valve.

10. The system of claim 1, wherein said dead time caliper fill circuit is further configured to seal after said pressure in said emergency brake optimization module reaches said pressure limit, such that pressure is supplied to said brake through said emergency brake valve.

11. The system of claim 1, wherein said emergency brake circuit further comprises a supply accumulator and a pressure reducing valve.

12. The system of claim 1, wherein said emergency brake circuit excludes a choke.

13. A system for regulating emergency brake application of a brake on at least one truck of a rail vehicle, comprising:
    a hydraulic braking circuit having a service brake circuit and an emergency brake circuit including an emergency brake valve positioned to regulate pressure supply to said brake on said at least one truck of said rail vehicle, and a brake supply line fluidly connecting said brake to said emergency brake valve; and
    an emergency brake bypass circuit module in fluid communication with said brake supply line between said emergency brake valve and said brake, said emergency brake bypass circuit module further comprising:
        a dead time caliper fill circuit positioned between and in direct fluid communication with said brake supply line; and
        a secondary volume consumption circuit in direct fluid communication with said brake supply line;
    wherein said emergency brake bypass circuit module is configured to, in response to activation of the emergency brake valve, (i) supply hydraulic fluid to said brake until a pressure in said emergency brake bypass circuit module reaches a predesignated pressure limit, and (ii) direct a portion of hydraulic fluid in said brake supply line to a jerk-limiting accumulator.

14. The system of claim 13, wherein said dead time caliper fill circuit further comprises a 2/2-way magnet valve and a pressure reducing valve.

15. The system of claim 14, wherein said dead time caliper fill circuit is configured to supply pressure to said brake until a pressure in said dead time caliper fill circuit reaches a pressure limit set by said pressure reducing valve.

16. The system of claim 15, wherein said dead time caliper fill circuit is further configured to seal after said pressure in said emergency brake bypass circuit module reaches said pressure limit, such that pressure is supplied to said brake through said emergency brake valve.

17. The system of claim 13, wherein said secondary volume consumption circuit further comprises a secondary emergency brake valve in fluid communication with said jerk-limiting accumulator.

18. The system of claim 17, wherein said system is configured to simultaneously initiate both said emergency brake valve and said secondary emergency brake valve.

19. The system of claim 17, wherein said emergency brake circuit further comprises a supply accumulator and a pressure reducing valve in fluid communication with said emergency brake.

20. The system of claim 19, wherein said emergency brake circuit excludes a choke.

21. A system for regulating emergency brake application of a brake on at least one truck of a rail vehicle, comprising:
    a hydraulic braking circuit having a service brake circuit and an emergency brake circuit including a primary emergency brake valve positioned to regulate pressure supply to said brake on said at least one truck of said rail vehicle, and a brake supply line fluidly connecting said brake to said emergency brake valve; and
    an emergency brake optimization module in fluid communication with said brake supply line between said emergency brake valve and said brake;

wherein said emergency brake optimization module comprises
a dead time caliper fill circuit in fluid communication with said brake supply line between said primary emergency valve and said brake, wherein said dead time caliper fill circuit is configured to provide an initial inflow of hydraulic fluid to the brake supply line during a dead time period of fluid supply through the emergency brake valve, wherein said dead time caliper fill circuit further comprises a pressure reducing valve, and wherein said dead time caliper fill circuit is further configured to supply pressure to said brake until a pressure in said dead time caliper fill circuit reaches a pressure limit set by said pressure reducing valve.

22. The system of claim 21, said emergency brake optimization module further comprising a secondary volume consumption circuit in fluid communication with said brake supply line between said primary emergency valve and said brake, wherein said secondary volume consumption circuit is configured to consumer excess hydraulic fluid during brake pressure buildup in said hydraulic braking circuit.

23. The system of claim 22, wherein said secondary volume consumption circuit further comprises a jerk-limiting accumulator reservoir in fluid communication with a secondary emergency brake valve.

24. The system of claim 23, wherein said system is configured to simultaneously initiate both said primary emergency brake valve and said secondary emergency brake valve.

25. The system of claim 21, wherein said dead time caliper fill circuit is further configured to seal after said pressure in said emergency brake bypass circuit module reaches said pressure limit, such that pressure is supplied to said brake through said emergency brake valve.

26. The system of claim 21, wherein said emergency brake circuit further comprises a supply accumulator and a pressure reducing valve.

27. The system of claim 26, wherein said emergency brake circuit excludes a choke.

* * * * *